United States Patent [19]
Miedema

[11] Patent Number: 5,203,259
[45] Date of Patent: Apr. 20, 1993

[54] BLUEBERRY DESTEMMER

[75] Inventor: A. Dale Miedema, Zeeland, Mich.

[73] Assignee: Lakewood Manufacturing Company, Holland, Mich.

[21] Appl. No.: 590,803

[22] Filed: Oct. 1, 1990

[51] Int. Cl.$^5$ ............................................. A23N 15/02
[52] U.S. Cl. ................................... 99/640; 99/585; 99/637; 492/36; 492/37
[58] Field of Search .................................. 99/635–637, 99/639, 640, 643, 623, 624, 584, 585; 198/382, 394; 426/481, 483; 29/110, 115, 132, 121.1

[56] References Cited

U.S. PATENT DOCUMENTS

| | | | |
|---|---|---|---|
| 1,835,190 | 12/1931 | Stansbury . | |
| 2,180,567 | 11/1939 | Urschel | 99/640 |
| 2,306,035 | 12/1942 | Burdick | 99/643 |
| 2,383,268 | 8/1945 | Morgan . | |
| 3,388,731 | 6/1968 | Reisterer et al. | 99/640 |
| 3,519,049 | 7/1970 | Tomelleri . | |
| 3,680,618 | 8/1972 | Pertics . | |
| 3,747,514 | 7/1973 | Ireland | 99/640 |
| 3,747,515 | 7/1973 | Pertics | 99/640 |
| 4,122,766 | 10/1978 | Ledebuhr et al. | 99/643 |
| 4,152,977 | 5/1979 | Lazzarini | 99/640 |
| 4,509,414 | 4/1985 | Chiu et al. | 99/585 |

FOREIGN PATENT DOCUMENTS

| | | | |
|---|---|---|---|
| 1277230 | 10/1961 | France | 99/640 |
| 2062400 | 6/1971 | France | 99/585 |

*Primary Examiner*—Timothy F. Simone

[57] ABSTRACT

A fruit destemmer leaving an endless conveyor belt made up of a plurality of counter-rotating metal rollers rotatably supported at each end by endless chains. The fruit destemmer has an inclined bed with a driven shaft at each end. Each driven shaft has a wheel at one end and a sprocket at the other with the positioning of the wheel and sprocket being reversed on the other drive shaft. The continuous chains are driven by spaced sprockets mounted on a shaft positioned below the inclined bed. A rotatably mounted shaft, having a wheel mounted on each end, presses each continuous chain into close contact with the driving sprockets. Any foreign matter which enters between an endless chain and a sprocket causes the endless chain to slip on the associated wheel thereby maintaining chain alignment. The rollers used to form the endless fruit conveying belt are made of hard anodized aluminum which has a surface pattern to reduce fruit skinning. The rollers are caused to rotate counter to each other by a pair of spaced segmented gear racks, each segment of which is individually adjustable. The number of segments in contact with the rollers can be decreased to reduce fruit damage as the fruit becomes softer as the fruit growing season progresses.

20 Claims, 5 Drawing Sheets

BLUEBERRY DESTEMMER

BACKGROUND OF THE INVENTION

During the berry harvesting season, large numbers of blueberries, gooseberries, raspberries and cherries need to be quickly destemmed before they are packaged for shipment. Machines have been developed for destemming such fruit, such as the machine disclosed in Pertics U.S. Pat. No. 3,680,618. The disclosed machine employs an endless fruit conveying belt made of a plurality of metal support rods covered with plastic tubing Each metal rod also has a piece of rubber tubing for contact with a stationary member which causes the roller to rotate. The rubber tubes are offset on the same ends of adjacent rollers and the stationary members are positioned above and below the rods so that adjacent rollers roll toward each other, forming a nip for gripping the stem and pulling it off of the berry.

The machine such as disclosed in the above-mentioned patent performed well for the intended purpose. However, it did suffer from several drawbacks. For example, the smooth plastic surface on each roller tended to cause the fruit to stick to the surface of the roller which resulted in heavy fruit damage due to skinning. The continuous fruit conveyor belt was also supported on spaced sprockets and, if a piece of stone or debris came between the chain and one of the sprockets, the chain would have to travel further and, in turn, would jump time causing all of the rollers to then cant. In order to put the machine back in alignment, the machine would have to be stopped and the strain taken off the chain so that it could be moved forward or backward into alignment. Since the machines are being used at the peak of the berry picking season, workers would be required to wait for the machine to be put back into alignment before resuming activities in feeding berries to the machine and packaging the product leaving the machine Another problem presented was that as the berry growing season progresses, the fruit becomes larger and softer. In the Pertics machine, the fruit was subjected to a continual destemming operation from one end of the machine to the other which resulted in loss of fruit due to skinning of the soft, overripe fruit The rollers in the machine also presented problems in that the plastic tubing was easily damaged by debris and was also easily stained and difficult to clean In the movement of the conveyor belt, the rotation of the rollers was dependent on frictional engagement between the aforementioned rubber tubing and a stationary member in the machine. Since a frictional contact was required, the movement would often be erratic as the rubber frictional member contacted dry and wet surfaces on the stationary member. The erratic movement of the rollers also resulted in fruit damage and loss of destemming action.

SUMMARY OF THE INVENTION

In accordance with the present invention, an improved destemming machine has been invented which substantially overcomes all of the above-mentioned difficulties. The device of the present invention can be used with many different types of fruit; however, for simplicity in description the term "blueberry" will be used as a collective term for all of the aforementioned fruits.

The device of the present invention also uses a continuous, endless fruit conveyor belt made of a plurality of rollers. The rollers of the improved machine are made out of machined metal so that the edges of each roller are precisely aligned and parallel The rollers also have the surface treated to reduce the tendency of the fruit to adhere to the roller, thereby reducing the amount of fruit loss due to skinning. The preferred embodiment of the roller has a plurality of spaced longitudinal grooves extending along the surface of the roller. Each roller is also positively driven by a gear mounted on each roller which contacts a stationary gear rack along each side of the machine. The positive gear drive also reduces the amount of fruit loss due to erratic movement of the rollers. Each of the gear racks in the device of the present invention is made of a plurality of individually adjustable segments so that the optimum contact can be made with each gear. As the fruit tends to become subject to damage in the latter portion of the growing season, the number of rack segments contacting the gears and, in turn, the endless conveyor belt, can be reduced so that only a few rollers rotate for destemming while the remaining rollers merely convey the fruit to the end of the machine. The improved metal rollers are also substantially stronger than the plastic covered rollers so the destemmer can be made wider to handle more fruit.

The improved machine is also substantially self-aligning with the endless belt being driven on each side by a pair of sprockets in combination with a pair of rollers which press the endless chains into contact with the sprockets. The driving sprockets and rollers are mounted near the bottom of the machine away from the fruit being processed and any foreign matter accompanying the fruit. On the working surface, the conveyor belt is supported by a pair of spaced, rotatably mounted shafts which have a sprocket mounted on one end and a wheel for carrying the chain mounted on the other end. The second rotative shaft has a similar sprocket and wheel; however, the orientation of the sprocket and wheel is reversed so that each endless chain is supported by at least one wheel. Through the use of this combined drive system for the endless chain, if a stone or twig comes between the chain and sprocket, causing the chain to go out of time, the chain will slip on the wheel and realign itself.

DETAILED DESCRIPTION OF THE PREFERRED EMBODIMENTS

Figure 1:
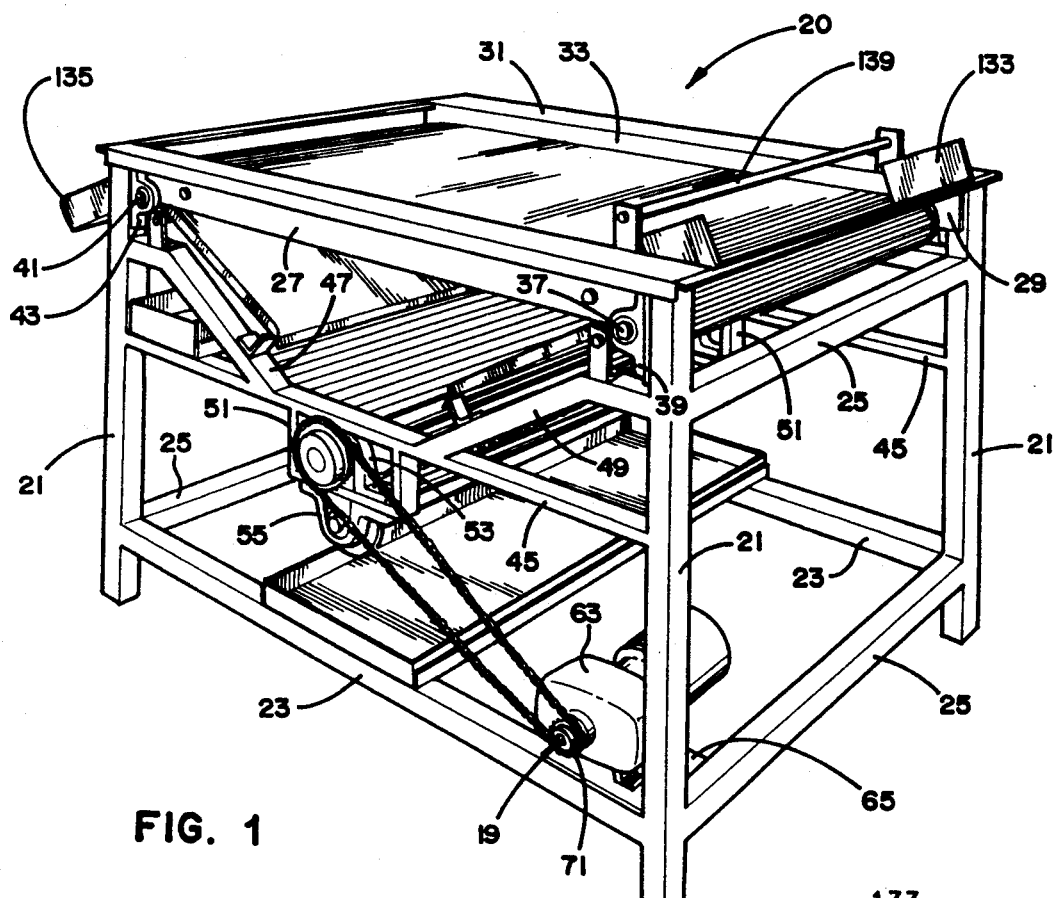
FIG. 1 is a perspective view of the destemming machine.

Referring to FIG. 1, the destemmer is shown and indicated generally by the number 20. The destemmer has a substantially rectangular, box-like frame having upstanding stanchions 21, longitudinal braces 23, and cross braces 25. A pair of vertical plates 27 and 29 are connected between the tops of stanchions 21 on each side of the destemmer. A cover 31, having depending edges 33 (only one of which is shown), covers the sides of the top surface of the destemmer and keeps fruit in the working area of the destemmer.

A rotatably mounted shaft 37 passes through side plates 27 and 29 and is journaled in a bearing block 39 (only one of which is shown), which is attached inside of stanchion 21. A similar bearing block rotatably supports the other end of shaft 37. A rotatably mounted shaft 41 passes through side plates 27 and 29 and is journaled in bearing block 43 (only one of which is shown), which is fastened on the inside of stanchion 21. A similar bearing block supports the other end of shaft 41. A pair of longitudinal frame members 45 extend between the inner edges of stanchion 21 and are supported by angular braces 47 and 49 (the angular braces on only one side being shown). A pair of box-like frame members 51 depend from longitudinal frame member 45 and are used to support a pair of bearing blocks 53 and 55, on each side, which rotatably support a pair of shafts which extend across the destemming machine.

Now referring to FIGS. 1 and 2, a rotatably mounted shaft 57 is supported in bearing block 53 while a second rotatably mounted shaft 59 is mounted below shaft 57 outside of box frame member 51. Bearing blocks 53 and 55, supporting shafts 57 and 59, are attached to the box frames by suitable bolts and nuts 61. A motor 63, preferably electric, is supported on plate 65 which is welded to longitudinal frame member 23. Motor 63 is fastened to the plate 65 by bolts 67. Electric motor 63 has an output shaft 69 upon which sprocket gear 71 is mounted. Shaft 57 has sprocket gear 73 thereon, and endless bicycle-type chain 75 is trained over and connects the two sprocket gears. Electric motor 63 directly drives shaft 57 through bicycle-like chain 75. In view of the stress on chain 75, it is preferred to use a number 50 bicycle chain.

Figure 3:
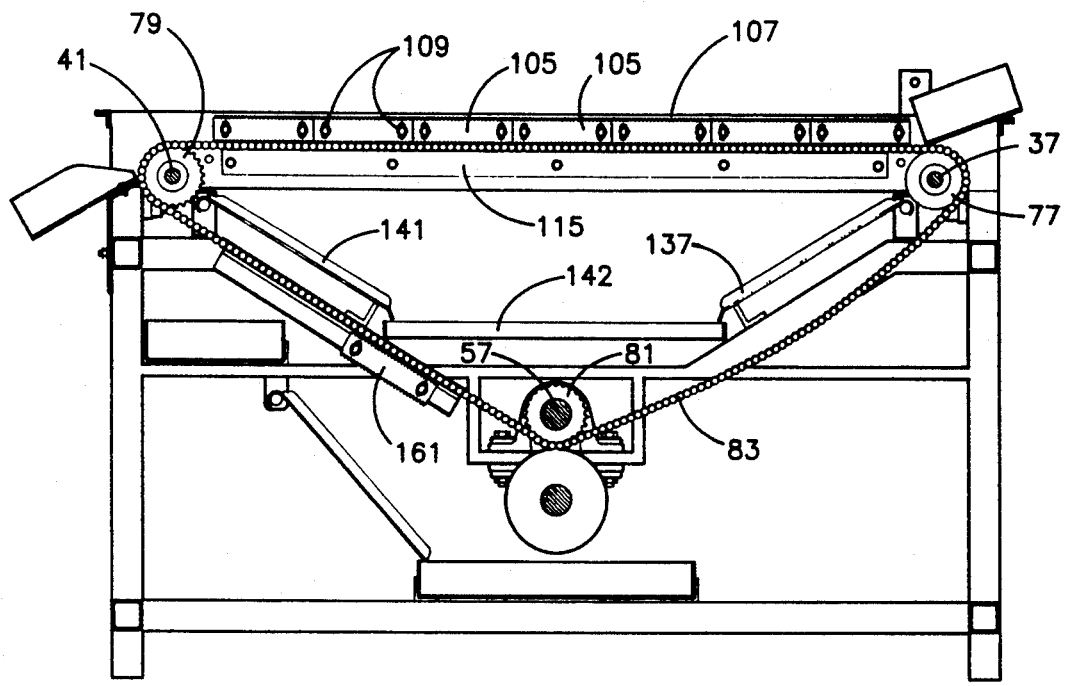
FIG. 3 is a side elevational view with parts removed to clearly show the endless chain drive
Figure 5:
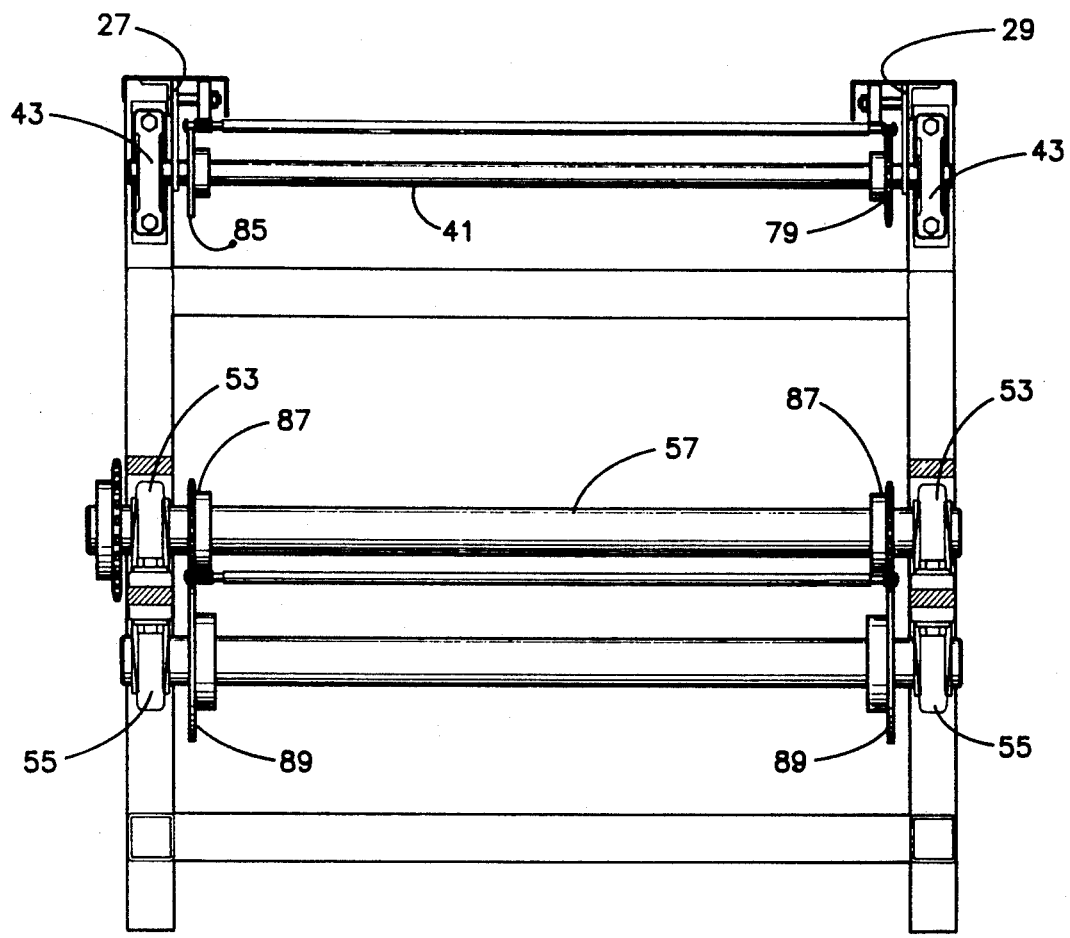
FIG. 5 is an end elevational view showing a roller passing over a sprocket and wheel at the upper level and a second roller passing through between the driving sprocket and the rollers for holding the endless conveyor belt pressed against the sprocket.

Turning now to FIGS. 3 and 5, rotatable shaft 37 is shown having a wheel 77 mounted thereon At the left end of the destemmer (FIG. 3) rotatable shaft 41 has a sprocket 79 mounted thereon Shaft 57 has a sprocket 81 mounted thereon. An endless bicycle-type chain 83 is trained over wheel 77, sprocket 79 and sprocket 81. Bicycle chain 83 is preferably a No. 40 size chain. Shaft 41 has sprocket 79 mounted on one end and wheel 85 (FIG. 5) mounted on the opposite end. Shaft 37 has a wheel and sprocket mounted thereon; however, on shaft 37 the sprocket is in line with the wheel on shaft 41 and the wheel on shaft 37 is aligned with the sprocket on shaft 41. Shaft 57 has a pair of spaced sprockets 87 mounted thereon. Shaft 59 has a pair of wheels 89 mounted inside of bearing blocks 55. A second bicycle-like chain 83 is trained over the sprocket on shaft 37, wheel 85 on shaft 41, and second sprocket 87 on shaft 57. The wheels 89 align with the sprockets 87 and force the driving chains 83 against the sprockets to preclude any possibility of the drive chains slipping.

The destemmer of the present invention is substantially self-aligning. The chains 83 at each side of conveyor belt 92 are driven by sprockets 87. The chains 83 are captured between the sprockets 87 and wheels 89. The chains 83 are tightly held in alignment while being driven from the bottom below the portion of the conveyor belt 92 carrying fruit and possibly foreign matter. If a stone or twig attempts to a cause chain 83 to go out of alignment, the chain will slip on the surface of the idler wheel relieving the pressure trying to cant the conveyor belt.

Figure 4:
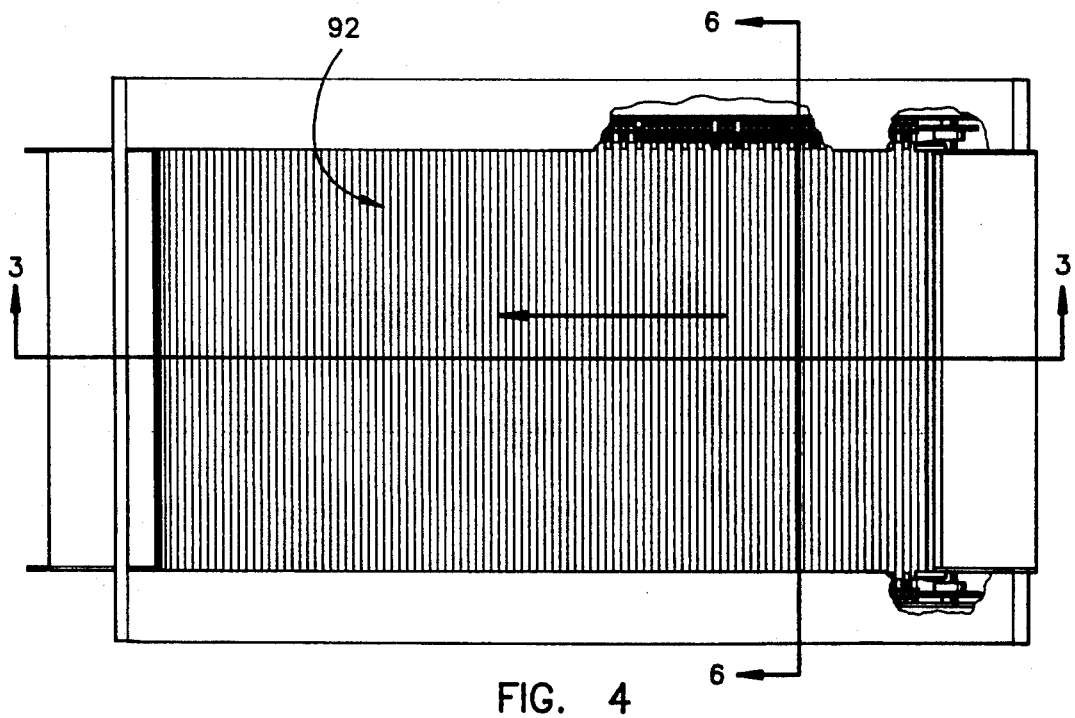
FIG. 4 is a top plan view, partially broken away, showing the continuous fruit conveyor belt and the gears on the ends of alternate rollers.
Figure 6:
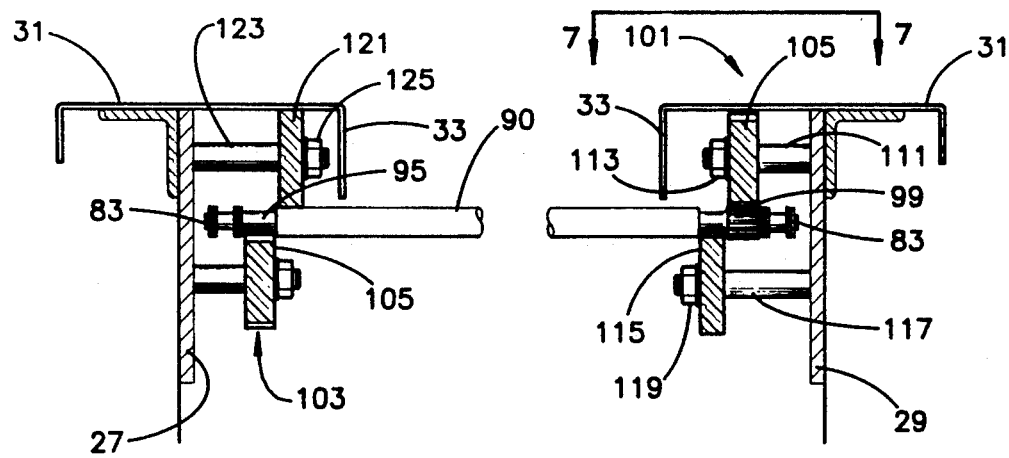
FIG. 6 is a sectional view showing the ends of a roller in contact with a gear rack and guide.
Figure 7:
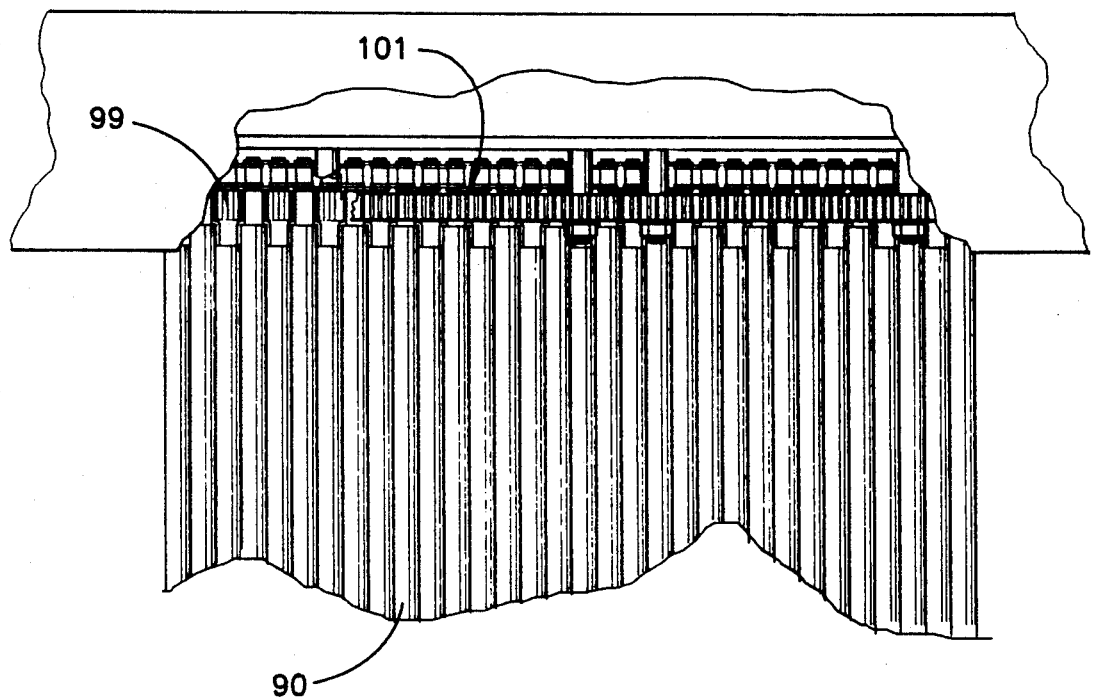
FIG. 7 is a top plan view partially broken away showing the gears on alternate rollers in alignment with the gear rack for driving the rollers.
Figure 8:
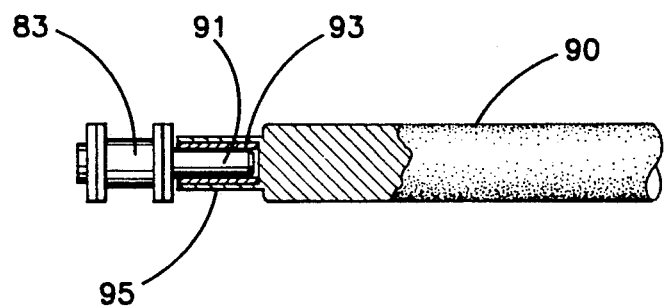
FIG. 8 is a partial sectional view of one end of a roller of the present invention.
Figure 9:
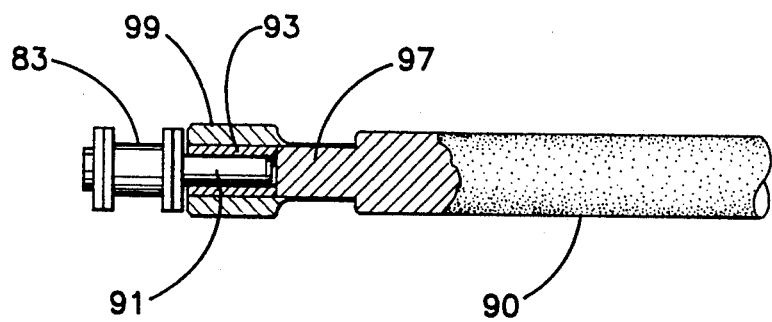
FIG. 9 is a partial sectional view of the opposite end of the roller of the present invention showing the gear in place.

A plurality of rollers 90 are connected between links on bicycle chains 83 and form a continuous conveyor belt for the fruit to be destemmed. Referring to FIGS. 6, 8 and 9, chain links 83 have a projecting pin 91 inserted into bushing 93 which is press fit into a blind hole in each end of each roller 90. Pins 91 support each end of the rollers 90 to form a fruit conveying endless belt 92. The ends of each roller are reduced in size with one end portion 95 being shorter than the end portion 97 at the opposite end of the roller 90. A gear 99 is press fit over the end portion of portion 97. Gear 99 preferably has 12 teeth and is of a 24 diametric pitch and is commonly referred to as 12/24 DP. As shown in FIGS. 4 and 7, rollers 90 are alternately positioned with gears 99 of adjacent rollers being at opposite ends. Each of rollers 90 is made of metal and preferably an aluminum alloy for strength and lightness. Each roller is precisely ground to a 0.490 inch diameter and is then blasted using a conventional surface blasting process to provide a surface finish that reduces skinning of the fruit The adhesion/suction of the fruit to the destemming rod or roller is eliminated by texturing the surface of the rod so that air is always present between the berry and the rod. The rod is then hard anodized to provide a long lasting, durable rod. The surfaces of the rollers are spaced 0.010 inch to form the nip for the berry stems.

Figure 11:
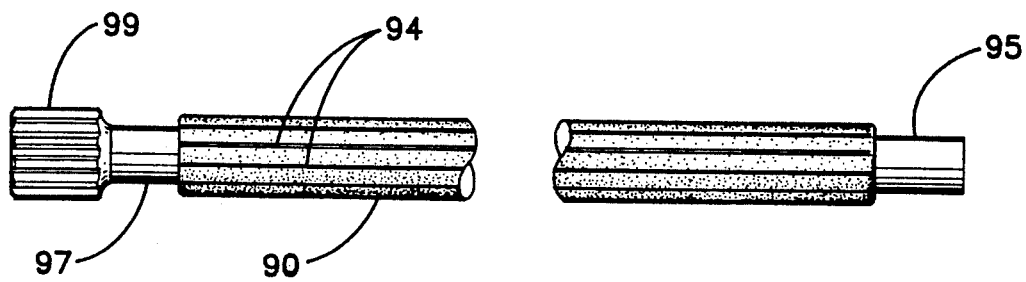
FIG. 11 is a partial view of a second embodiment of the roller of the present invention.

While the rollers thus far described perform well in the destemming machine, it has been found, referring to FIG. 11, that spaced longitudinal channels or grooves 94 in the surface of the rollers 90 substantially increase the percentage of berries destemmed. The depth of each channel or groove should preferably be approximately 0.015 inch. A plurality of spaced grooves should be used. It has been found convenient to use the teeth of the gear 99 as a guide for a thin grinding wheel to form the groove in the textured roller surface.

There are several advantages gained through the use of a metal rod. The diameter of the rod can be precisely controlled which is not possible with the rubber or plastic coated rods. The precise diameter control allows the manufacturer to size the rod so the optimum gap between rods is achieved This results in a greater percent of stems being removed from the fruit. As discussed above, the adhesion/suction of the fruit to the destemming rod is eliminated by the textured surface and oil, sunlight, and ozone do not affect the all-metal rod This allows for lubrication of the chain which will increase chain and bushing life. The metal rods can also be longer than the plastic coated rods allowing the destemmer to be increased in width and in capacity.

In the operation of the destemmer, the bicycle chains 83 move the conveyor belt 92, made of the plurality of rotatably mounted rollers 90, about the machine. As mentioned previously, rollers 90 are oriented in the machine so that adjacent rollers have gears 99 positioned at opposite ends. In order to cause the rollers to rotate toward one another, forming a nip for gripping the berry stems, each end of the rollers contact substantially identical gear racks 101 (FIG. 7) and 103 (FIG. 6). Each of the gear racks is substantially identical and, as shown in FIGS. 3 and 7, are made up of a plurality of segments 105 which have gear teeth 107 along both elongated edges (FIG. 10) so that the segments can simply be reversed when the gear rack becomes worn on one side. Each of the segments 105 also has spaced elongated apertures 109 which permit vertical adjustment of the segments and, very importantly, permit the length of the destemming bed to be shortened by disengaging gear rack segments 105 when needed to protect very ripe berries. Near the end of the growing season, the berries tend to be quite large and soft. In order to protect this soft fruit, several of the gear rack segments 105 of gear racks 101 can be raised while corresponding gear racks in rack 103 can be lowered to reduce the number of rollers turning and pulling at the stems and at the surface of the berries. The destemmer then has a shorter section for removing stems from the fruit while the remainder of the rollers merely convey the fruit through the machine.

Referring to FIG. 6, the roller 90 is shown supported at each end by a link of bicycle chain 83. Gear 99 is in contact with a segment 105 of upper gear rack 101. The segment 105 is adjustably supported by bolt 111 and nut 113. A guide for the rollers 115 is mounted below and in contact with the thin portion 97 of the roller. The guide 115 is made of a length of plastic material such as nylon or Teflon, and is fastened to the frame of the destemmer by bolt 117 and nut 119. The guide 115 enables the bicycle chain and rollers to maintain a smooth path. The opposite end of roller 90, shown in FIG. 6, is not in contact with segment 105 of gear rack 103 since it does not have a gear. Thin portion 95 is in contact with a guide strip 121, similar to guide 115. Guide 121 extends the length of rack 103 and is fastened to the frame of the machine by bolt 123 and nut 125. Gear rack 105 above the rollers and gear rack 103 below the rollers causes the rollers to rotate toward one another forming a nip for the stem of the fruit as the continuous conveyor belt circulates through the machine.

Figure 10:
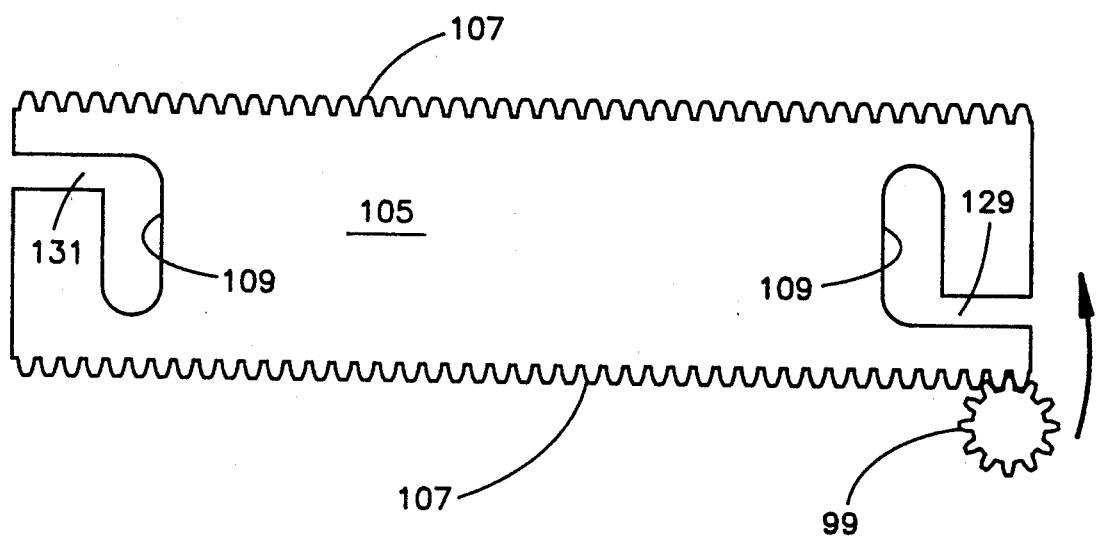
FIG. 10 is a side elevational view of the lead segment of the gear rack showing the relieved portion used to facilitate engagement with a gear and the alignment slots for the adjustment of each rack segment.

As shown in FIG. 10, as gear 99 initially contacts teeth 107 on gear rack segment 105, the gear teeth may not mesh immediately. In order to provide flexibility in the leading edge of the gear rack segment, a portion 129 is cut out of the gear rack segment. This enables teeth 107 at the leading edge of the gear rack segment to flex until the teeth mesh with the teeth of gear 99. Gear 99 can then freely move along, passing from gear rack segment to gear rack segment through the destemmer. A second portion 131 is removed from the trailing edge of gear rack segment 105 in order to provide for interchangeability of gear teeth 107. Segment 105, shown in FIG. 10, merely has to be inverted end for end to bring the new teeth to the leading edge of the gear rack.

Figure 2:
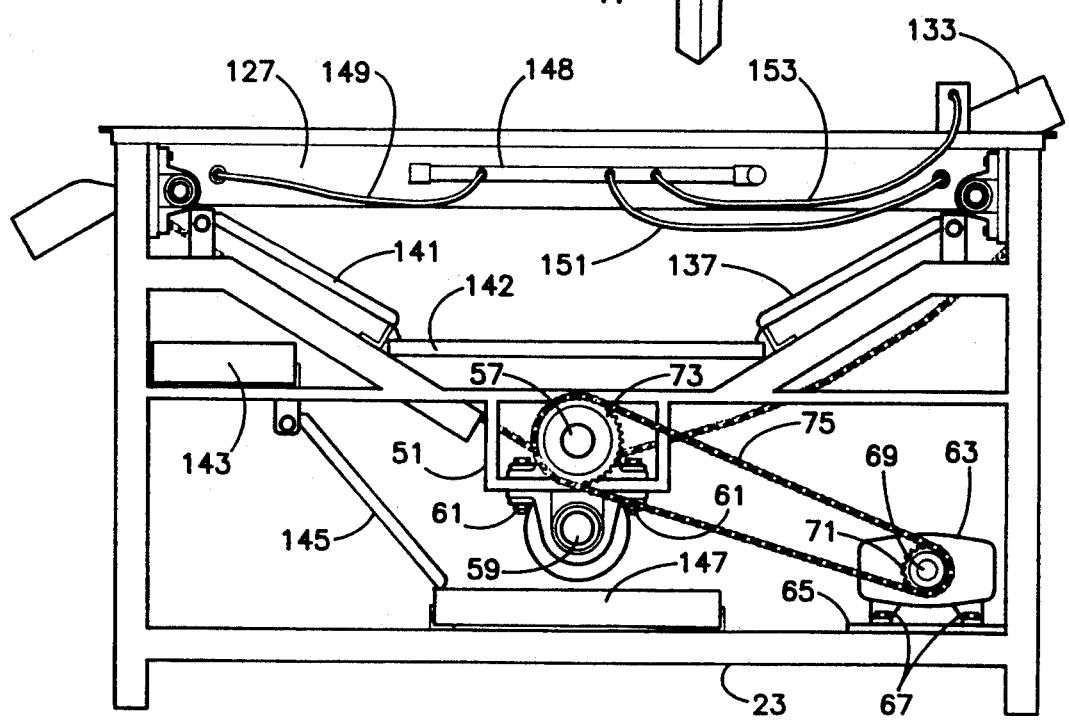
FIG. 2 is a side elevational view of the destemming machine of FIG. 1 showing water lines connected for wetting the fruit and flushing away debris.

Returning now to the discussion of FIGS. 2 and 3, the destemmer has an input chute 133 where the fruit can be dumped into the machine and fed onto conveyor belt 92. At the end of the machine a chute 135 carries the cleaned and destemmed fruit from the destemmer Below and in the vicinity of input chute 133 is a chute 137 for deflecting any dirt or debris which is washed from the fruit by water spray bar 139 which extends across chute 133. A chute 141 is below the exit of the destemmer for deflecting water and debris at this point. A pan 142 collects dirt and debris from chutes 137 and 141. A pan 143, chute 145 and a second pan 147 are positioned inside the frame for gathering stems, fruit, water nd debris falling in the machine. A water manifold 148 is mounted on the side plate 27 and delivers water through a plurality of hoses 149, 151 and 153 to areas to be washed during the destemming process.

Referring to FIG. 3, and in line with the previous discussion, the destemming rollers roll toward each other to form a nip for gripping the stems of the fruit. As the machine operates, an occasional pulp or skin may also be pulled into the space between the rollers, and may adhere to the rollers. As the conveyor belt circulates through the destemmer, one side of the conveyor belt comes into contact with gear rack segment 161, which is supported below the conveyor belt, which causes those rollers in contact with the segment to rotate in a direction opposite to the former direction so that the rollers will tend to kick out or expel any foreign material which gathers between the rollers and on the surface of the rollers.

In order to increase the movement of the blueberries on conveyor belt 92, and in turn increase the likelihood of destemming all of the berries, flexible flaps, such as disclosed in Pertics U.S. Pat. No. 3,747,515 can be positioned above the conveyor belt Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A self-aligning fruit destemmer comprising:
  a substantially rectangular supporting frame;
  a first and a second driven shaft rotatably mounted on said supporting frame with one shaft mounted near each end of said frame;
  a sprocket on opposite ends of each of said first and second driven shafts;
  a wheel on opposite ends of said first and second driven shafts with said wheels and sprockets being oppositely mounted on each driven shaft;
  a driving shaft mounted below said driven shafts;
  a pair of spaced sprockets mounted on said driving shaft;
  a first endless chain connecting the sprocket on said first driven shaft, the wheel on said second driven shaft and the sprocket on said driving shaft;
  a second endless chain connecting the wheel on said first driven shaft, the sprocket on said second driven shaft and a sprocket on said driving shaft;
  a plurality of rotatable rollers mounted between said first and second endless chains forming an endless belt for carrying fruit to be destemmed;
  said wheels on said first and second driven shafts enable said first and second endless chains to slide on the surface of said wheels, maintaining the alignment of said rollers, if either of said first and second endless chains attempts to come out of alignment due to the presence of an object in the path of the chain.

2. A self-aligning drive for a fruit destemmer as set forth in claim 1, including:
a fourth driven shaft supported on said frame for cooperating with said third driven shaft;
a wheel mounted near each end of said fourth driven shaft for holding said endless chains on said fruit conveying endless belt against said sprockets on said third driven shaft to prevent either chain from slipping on said sprockets.

3. A self-aligning fruit destemmer comprising:
a first and a second driven shaft;
a frame for rotatably supporting said first and second driven shafts;
a wheel and a sprocket mounted on opposite ends of said first and second driven shafts;
a third driven shaft supported on said frame below said first and second driven shafts;
a sprocket on each end of said third driven shaft;
said wheels and sprockets on each end of said first and second driven shafts being oriented in the same plane as a sprocket on the same end of said third driven shaft;
a pair of continuous endless chains connecting the wheels and sprockets on respective ends of said first and second driven shafts and the sprockets on said third driven shaft;
a driving means connected to said third driven shaft;
a plurality of spaced metal rollers rotatably connected between each of said endless chains;
a gear mounted on one end of each of said rollers with the gears on adjacent rollers being on opposite ends;
a pair of spaced gear racks mounted on opposite sides of said frame for cooperating with said gears on each end of said rollers for driving adjacent pairs of rollers toward each other as said endless chains and said rollers move about said driving and driven shafts under the influence of said driving means;
whereby any debris or object which might cause either of said endless chains to go out of time will merely cause said chains to slip on said wheels restoring the timing of said affected chain.

4. A self-aligning fruit destemmer as set forth in claim 3, wherein each of said gear racks comprises a plurality of gear rack segments.

5. A self-aligning fruit destemmer as set forth in claim 3 wherein each of said gear rack segments is individually adjustable.

6. A self-aligning fruit destemmer as set forth in claim 3, wherein the number of gear rack segments in contact with said gears on said rollers can be changed to vary the number of rollers being driven to reduce fruit damage.

7. A self-aligning fruit destemmer as set forth in claim 3, wherein said gear rack segments have a gear rack surface on two sides and are reversible.

8. A self-aligning fruit destemmer as set forth in claim 3, wherein the leading edge in the first segment of said gear rack has a cutout portion to enable said gear rack segment to flex as it brings said gear on said roller into alignment with the teeth on said gear rack.

9. A fruit destemmer as set forth in claim 2, including at least one gear rack segment mounted on said frame for causing said rollers to rotate in a reverse direction to expel any material remaining between said rollers after said rollers have finished destemming and transporting said fruit.

10. A self-aligning drive for a fruit destemmer having a fruit conveying endless belt made up of counter-rotating rollers rotatably supported at each end by endless chains comprising:
a supporting frame;
a first driven shaft rotatably supported by said frame;
a second driven shaft spaced from said first driven shaft and supported by said frame;
a wheel and a sprocket mounted on opposite ends of said first driven shaft;
a wheel and a sprocket mounted on opposite ends of said second driven shaft, said wheel and sprocket being reversed from the orientation of said wheel and sprocket on said first driven shaft;
a third driven shaft rotatably supported on said frame parallel to and below said first and second driven shafts;
a sprocket mounted on each end of said third driven shaft;
said fruit conveying endless belt being movably supported on said wheel and sprocket on each of said first and second driven shafts and being driven by said sprockets on said third driven shaft;
a driving means for said third driven shaft for causing said fruit conveying endless belt to move about said driven shafts being maintained in proper alignment by said sprockets on said third driven shaft and by the slippage of said endless chains on said wheels when a foreign object attempts to make said endless chains lose alignment.

11. A roller for fruit destemmers comprising:
an elongated metal rod having a metal surface for contacting the fruit;
an enlarged portion of said metal rod having substantially parallel edges forming a roller;
a gear mounted on one end of said metal rod for causing said metal rod to rotate under the influence of a cooperating gear rack; and
a textured surface on said metal roller for reducing the adhesion of said metal roller for the skin of fruit being destemmed.

12. A metal roller for a fruit destemmer as set forth in claim 11, including:
a plurality of longitudinal grooves spaced about the said textured surface of said metal roller.

13. A metal roller for a fruit destemmer as set forth in claim 12, wherein said grooves are approximately 0.015 inch in depth.

14. An improved gear rack for causing the rotatably supported rollers in an endless fruit conveyor belt to rotate toward each other forming a plurality of moving nips for removing the stem from fruit comprising:
a plurality of individually adjustable substantially rectangular plastic blocks having a gear rack formed on at least one side of said block, each block having a pair of spaced elongated slots to allow movement on a pair of spaced supports, said blocks being mounted end to end to form an elongated rack.

15. An improved gear rack as set forth in claim 14, wherein said first segment of said gear rack to contact a gear has a cutout portion above the initial gear teeth to enable the internal gear teeth to flex as the segment encounters a gear and brings the gear into engagement to pass along the gear rack.

16. The improved gear rack of claim 14 wherein said individual plastic blocks have a segment of a gear rack formed along at least two faces so that a new gear rack can be brought into service when needed by merely reversing said plastic block.

17. The improved gear rack of claim 14, wherein the number of gear rack segments in contact with the endless fruit conveyor belt can be varied depending upon the condition of the fruit with fewer segments being used for soft fruit to reduce damage to the fruit.

18. An endless fruit conveyor belt for a fruit processing machine comprising:
    a pair of spaced endless chins made up of multiple interconnected links;
    a plurality of support pins projecting from one side of each chain with said support pins on each chain being aligned and facing toward each other;
    a plurality of metal rollers being rotatably supported upon opposed pairs of support pins, each of said metal rollers having a metal fruit contacting textured surface;
    a gear mounted on one end of each roller of said plurality of metal rollers with the gears on adjacent rollers being mounted upon opposite ends.

19. An endless fruit conveyor belt as set forth in claim 18, wherein each of said rollers comprises a length of round metal rod machined with parallel sides and with a surface configuration on each metal roller to reduce fruit skinning.

20. An endless fruit conveyor belt as set forth in claim 16, wherein each of said metal rollers is made of aluminum alloy which has been blasted to provide a textured metal surface and hard anodized to reduce wear.

* * * * *

UNITED STATES PATENT AND TRADEMARK OFFICE
CERTIFICATE OF CORRECTION

PATENT NO. : 5,203,259

DATED : April 20, 1993

INVENTOR(S) : A. Dale Miedema

It is certified that error appears in the above-indentified patent and that said Letters Patent is hereby corrected as shown below:

column 1, line 12: after "tubing" insert --.--;

column 1, line 39: after "machine" insert --.--;

column 1, line 44: after "fruit" insert --.--; (second occurrence)

column 1, line 47: after "clean" insert --.--;

column 2, line 3: after "parallel" insert --.--;

column 2, line 54: after "drive" insert --;--;

column 3, line 59: after "thereon" insert --.--;

column 3, line 61: after "thereon" insert --.--;

column 4, line 40: after "fruit" insert --.--;

column 4, line 62: after "achieved" insert --.--;

column 4, line 67: after "rod" insert --.--;

column 6, line 2: after "destemmer" insert --.--; (second occurrence)

column 6, line 11: "nd" should be --and--;

column 9, claim 18, line 13: "chins" should be -- chains--;

column 10, claim 18, line 5: after "each" insert --metal--;

UNITED STATES PATENT AND TRADEMARK OFFICE
CERTIFICATE OF CORRECTION

PATENT NO. : 5,203,259
DATED : April 20, 1993
INVENTOR(S) : A. Dale Miedema

It is certified that error appears in the above-indentified patent and that said Letters Patent is hereby corrected as shown below:

column 10, line 9, claim 19: after "said" insert --metal--;

column 10, line 14, claim 20: delete "16" and insert therefor --19--.

Signed and Sealed this

Ninth Day of May, 1995

Attest:

BRUCE LEHMAN

Attesting Officer        Commissioner of Patents and Trademarks